US012699994B2

(12) United States Patent
Ganatra et al.

(10) Patent No.: US 12,699,994 B2
(45) Date of Patent: Aug. 4, 2026

(54) ARTIFICIAL INTELLIGENCE TO HANDLE FINANCIAL ACTIONS

(71) Applicant: Pipe Technologies Inc., San Francisco, CA (US)

(72) Inventors: Namrata Ganatra, Menlo Park, CA (US); Jingwen Wei, Brooklyn, NY (US); Vishwas Gowda, Bengaluru (IN)

(73) Assignee: PIPE TECHNOLOGIES INC., San Francisco, CA (US)

( * ) Notice: Subject to any disclaimer, the term of this patent is extended or adjusted under 35 U.S.C. 154(b) by 0 days.

(21) Appl. No.: 18/904,586

(22) Filed: Oct. 2, 2024

(65) Prior Publication Data

US 2026/0094153 A1     Apr. 2, 2026

(51) Int. Cl.
| | |
|---|---|
| *G06Q 30/00* | (2023.01) |
| *G06F 40/35* | (2020.01) |
| *G06F 40/40* | (2020.01) |
| *G06Q 20/38* | (2012.01) |

(52) U.S. Cl.
CPC .......... *G06Q 20/386* (2020.05); *G06F 40/35* (2020.01); *G06F 40/40* (2020.01)

(58) Field of Classification Search
CPC .................................................. G06Q 20/386

USPC ..... 705/39, 1.1, 45, 30, 40, 18, 70; 704/231, 704/232, 260; 235/379
See application file for complete search history.

(56) References Cited

U.S. PATENT DOCUMENTS

| | | | |
|---|---|---|---|
| 2018/0012163 A1* | 1/2018 | Smith | .................... G06F 16/243 |
| 2021/0133397 A1* | 5/2021 | Migoya | .................... H04L 51/56 |
| 2024/0062016 A1* | 2/2024 | Tong | ....................... G06F 40/20 |

OTHER PUBLICATIONS

ProQuestDialogNPL Search History.*
IP.com NPL Search History.*

* cited by examiner

*Primary Examiner* — John H. Holly
(74) *Attorney, Agent, or Firm* — Polsinelli PC

(57) ABSTRACT

In one aspect, a computer-implemented method includes: receiving, by an interface to an AI-assistant service, a request to carry out a financial transaction pertaining to a particular account; receiving, from the AI-assistant service, a text response to the request to carry out the financial transaction, wherein the text response is an instruction to carry out the financial transaction; and performing, by a financial service, the financial transaction as instructed in the text response, whereby the financial transaction is semi-autonomously performed in response to the request.

20 Claims, 8 Drawing Sheets

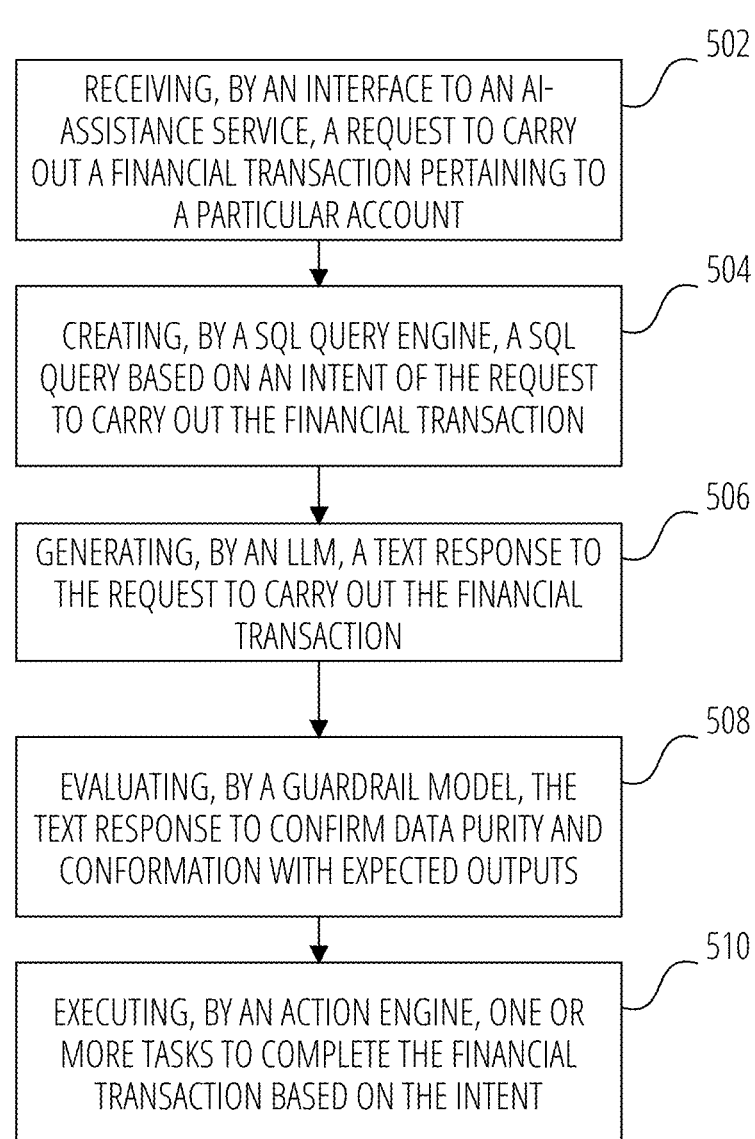

502

RECEIVING, BY AN INTERFACE TO AN AI-ASSISTANCE SERVICE, A REQUEST TO CARRY OUT A FINANCIAL TRANSACTION PERTAINING TO A PARTICULAR ACCOUNT

504

CREATING, BY A SQL QUERY ENGINE, A SQL QUERY BASED ON AN INTENT OF THE REQUEST TO CARRY OUT THE FINANCIAL TRANSACTION

506

GENERATING, BY AN LLM, A TEXT RESPONSE TO THE REQUEST TO CARRY OUT THE FINANCIAL TRANSACTION

508

EVALUATING, BY A GUARDRAIL MODEL, THE TEXT RESPONSE TO CONFIRM DATA PURITY AND CONFORMATION WITH EXPECTED OUTPUTS

510

EXECUTING, BY AN ACTION ENGINE, ONE OR MORE TASKS TO COMPLETE THE FINANCIAL TRANSACTION BASED ON THE INTENT

FIG. 5

ARTIFICIAL INTELLIGENCE TO HANDLE FINANCIAL ACTIONS

The present technology generally relates to the field of machine learning (ML) and/or artificial intelligence (AI), and more particularly, to systems and techniques for servicing natural language queries using one or more large language models (LLMs).

BACKGROUND

LLMs are designed to understand, generate, and interact with human language. Thus, LLMs can be implemented to facilitate interactions between a human and an underlying system via a virtual agent or chatbot. LLMs can be leveraged for applications in customer service such as handling questions and providing instructions to customers. LLMs can be trained on large amounts of text data to provide conversational interactions without reliance on predefined scripts or responses. LLMs can be used to generate conversational replies and other text-based outputs in real-time, based on a combination of the training applied to the LLM and the user inputs or queries used for prompting.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 5 illustrates a process for responding to conversational user queries about their finances or for carrying out a financial transaction in accordance with some embodiments of the present technology.

DETAILED DESCRIPTION

Figure 1:
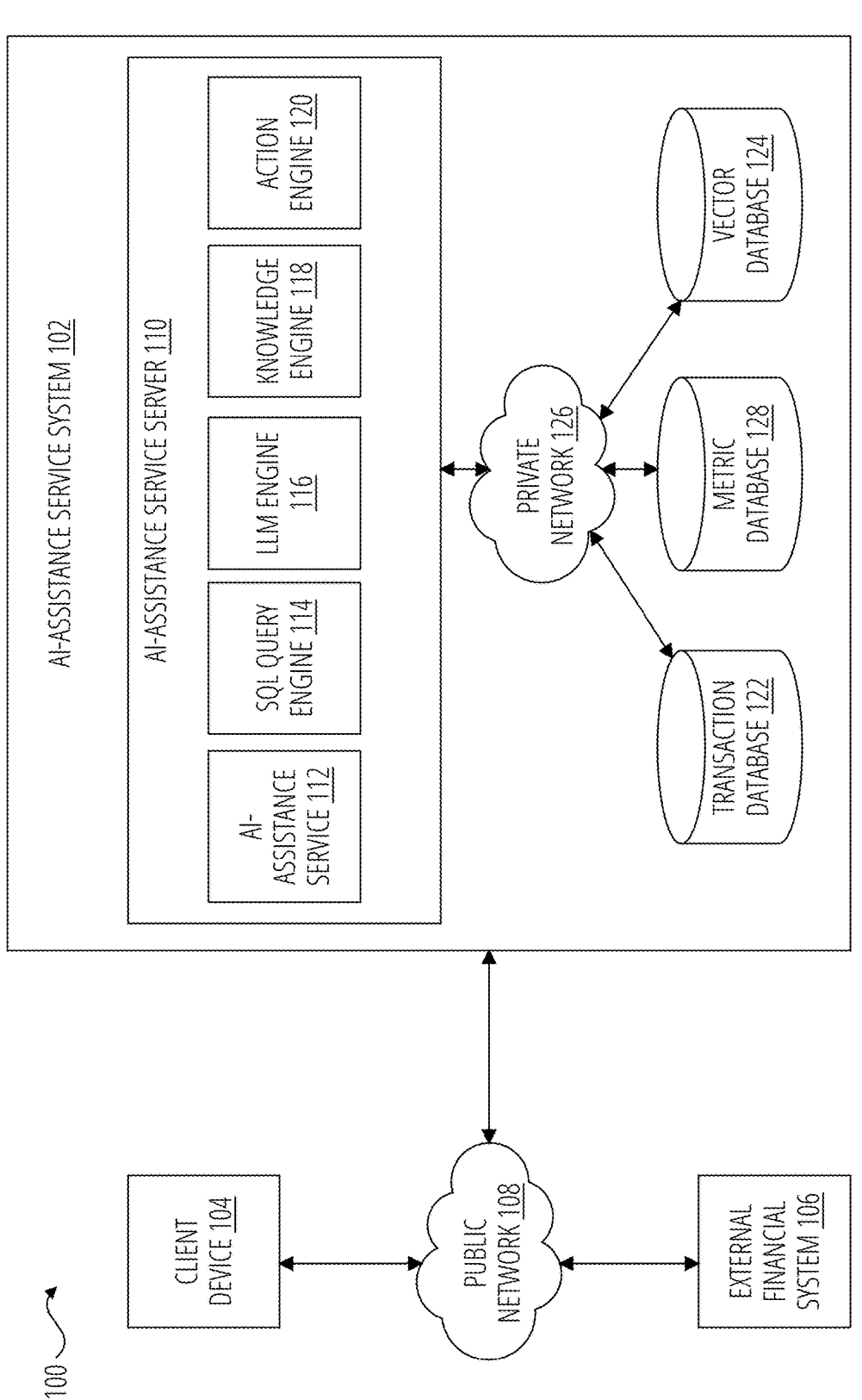
FIG. 1 illustrates an example architecture of a system for providing an AI-assistance service in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The present technology addresses the need in the art for systems and techniques that mitigate LLM hallucination and ensure data purity for the application of LLMs to complete financial requests and transactions. In some aspects, the systems and methods described herein can be used to provide real-time and/or synchronous interactions between a user and an interface of an AI-assistance service (e.g., a chatbot) to facilitate completion of financial requests or transactions.

LLMs can have important applications for enterprises by providing functionality to handle customer requests. However, LLMs can be limited in their application to various business cases due to the risk of hallucination. Systems and methods described herein reduce this risk, thereby enabling LLMs to be used as a basis for facilitating requests and transactions in applications, such as finance, where hallucinations can affect a decision-making process (e.g., qualification of the user for capital). Accordingly, disclosed systems and methods can leverage financial documents (e.g., financial statements, transactional statements, profit and loss (P&L) reports, and the like) to enable users to perform data analysis, track key performance indicators (KPIs), receive comprehensive summaries, and receive actionable insights. In other examples, disclosed systems and methods can facilitate completion of requests for financial transactions, such as applications for loans, lines of credit, or funding.

In financial applications, such as those described above, it is important to both the financial institution involved and the customer that the LLMs providing actionable prompts or completing transaction requests respond based on accurate data that reflects the customer's true financial position. Further, hallucination by an LLM can result in a financial transaction being mistakenly granted or denied based on faulty logic. For these reasons, it is difficult and risky to implement LLMs to provide interfaces to users aimed at analyzing or synthesizing financial data or completing financial transactions.

In financial applications, data is often stored in structured databases in a tabularized format. While an LLM may understand Structured Query Language (SQL) syntax of a query, the LLM may not have knowledge of a particular database's schema or structure. This limits an LLM's ability to generate an executable query for a particular database. Disclosed systems and methods address this limitation by pairing an LLM with a SQL query engine such that the SQL query engine can leverage the LLM, while developing a query specific to the structure of a particular database.

Systems, apparatuses, processes, and computer-readable media are described herein that can address these shortcomings and more, based on implementing an intelligent, LLM-based generative application that can be used to provide financial insights and complete financial transactions.

For example, disclosed systems and methods can implement an AI-assistance service. The AI-assistance service can include an interface for facilitating interaction with a user. The AI-assistance service can receive a request from a client device associated with a user account, to carry out a financial transaction on behalf of the user account. The request can be, for example, a request for additional funding of an enterprise associated with the user account. The AI-assistance service can interact with one or more components to service requests received from the user account.

In some embodiments, the AI-assistance service can receive a natural-language request from the user account. The AI-assistance service can act as a proxy layer to facilitate communication between components of an AI-assistance service system to handle the request. For example, the AI-assistance service can provide the natural-language request to an intent model to determine an intent of the request. An intent of the request can refer to a goal, or aim, of the user in providing the request. As a non-limiting example, a natural-language request can be "How much capital am I eligible for?" Thus, the intent of the request can be to determine an amount of capital that the user, or associated enterprise, is eligible for based on the user's, or the associated enterprise's, current financial position and previous financial history.

Based on the determined intent, the AI-assistance service system can pass the request to either a SQL query engine (e.g., if the request is related to financial insights) or to a knowledge engine (e.g., if the request is related to questions of general or personalized business strategy). An example of a general business strategy question can be, "What are the different types of financing options available for small businesses?" The SQL query engine of the AI-assistance service system can generate a structured query (e.g., a SQL query) configured to retrieve data associated with the user account from a database. For example, by mapping the user request, as well as any parameters, to a relevant metric based on a schema of the database, the SQL query engine can generate a structured query and guard against risk of hallucination and irrelevant structured queries. Executing the structured query can return data associated with the user account that can be used as input to a language model of an LLM engine to provide a response to the request. In some examples, the language model can be a natural language generation model that converts the response from the SQL query engine into a natural language response that it returns to the user.

A knowledge engine of the AI-assistance service system can generate the response based on the data it is trained on and using retrieval mechanisms. For example, a model of the knowledge engine can be trained on a corpus of articles, including finance knowledge articles. The knowledge engine model can be configurable and can be trained on any set of articles to generate strategic responses based on the content and context of the knowledge articles. For example, the knowledge engine model can be trained on a corpus of articles encompassing material on financial products, engineering, financial risk, and marketing. The knowledge engine can implement RAG with the use of one or more vector databases. The one or more vector databases can store textual data represented in a numerical format. For example, the one or more vector databases can store information that can be used to answer general business, financial, or strategic questions. When the knowledge engine receives a request, it can perform a similarity search on the one or more vector databases to retrieve the most relevant context, or information, that can be used to answer the request. Using this context, an answer to the request can be generated using an LLM of the knowledge engine. The generated answer can be provided, by the AI-assistance service system, as a response to the request.

In some embodiments the language model of the LLM engine can be used to deliver natural language responses to the user's request. In some examples, the AI-assistance service can further prompt the user to provide any additional information required to service the request, such as additional context or data that is not currently stored in the database. In some embodiments, additional inputs to the language model of the LLM engine can include the conversation history of the user with the interface of the AI-assistance service. For example, a chat memory may be accessible to the language model and can be used to enhance continuity and contextual relevance of interactions with the user.

In some embodiments, once the response is affirmed by the appropriate engine (i.e., the SQL query engine or the knowledge engine), the AI-assistance service passes the response to an action engine. The action engine can receive a prompt to carry out a financial transaction associated with the request. The action engine can interface with one or more application programming interfaces (APIs) to complete a financial transaction based on the intent. For example, the action engine can use the data retrieved from the database, as well as any context or information received from the user and stored in the chat memory, to complete and submit an application or otherwise complete a financial transaction.

Thus, the AI-assistance service can facilitate interactions with a user to provide insights about the user's or an associated enterprise's financial position and to carry out a financial transaction. Guardrail strategies implemented throughout the AI-assistance service system can mitigate the above-described limitations of applying LLMs to financial applications. For example, a guardrail model implemented by the AI-assistance service system can ensure the answer generated by the LLM engine and the action taken by the action engine are relevant and accurate. The AI-assistance service system can also confirm that the user's question (e.g., the request) is answerable or relevant using available data, and can then prompt the user to provide additional data or to confirm the data in question, thereby ensuring that the generated response will be accurate to the user's question or request. For example, if the user asks "what car should I buy" or "what breed of dog is best behaved," to the AI-assistance service, the guardrail strategies would determine that the provided prompt is outside the domain of knowledge of the AI-assistance service system. For example, the AI-assistance service can response "Sorry, I cannot answer questions outside of the financial domain," or "I am not an expert on questions outside of the financial domain, so please don't rely on my answers outside of this domain."

The SQL query engine and the action engine can preserve data privacy by implementing security engineering approaches like user authentication/authorization or structured query augmentation (e.g., application of a filter on the data retrieved from the transaction database). In some examples, a response generated by the knowledge engine can include references or links to the original, relied upon text to mitigate reliance on summarization. A confirmation screen shown in the chat interface can ensure the user confirms the action that the action engine will take prior to executing the action.

Further aspects of the systems and techniques will be described with reference to the figures.

FIG. 1 illustrates an example architecture of a system 100 for providing an AI-assistance service in accordance with some embodiments of the present technology. For example, the system 100 can be implemented to provide an AI-assistance service for completing financial transactions and providing insights based on analysis of financial information. One or more of the disclosed techniques may be implemented in or involve one or more computer systems.

The system 100 can include an AI-assistance service system 102, a client device 104, and an external financial system 106, which may be connected via a public network 108. The AI-assistance service system 102 can be configured to provide an AI-assistance service server 110 such that a user associated with the client device 104 can interact with the AI-assistance service system 102 to receive insights and analysis based on financial data or to complete a financial transaction. In some embodiments, the AI-assistance service system 102 can interact with an external financial system 106 to complete a requested financial transaction.

The AI-assistance service system 102 can be distributed across one or more computing devices. The AI-assistance service system 102 can include an AI-assistance service server 110 for providing an interface through which a user of the client device 104 can execute requests for analysis of financial data or to complete a financial transaction. The AI-assistance service server 110 can include one or more processing devices that execute program code, such as the AI-assistance service 112, a SQL query engine 114, an LLM engine 116, a knowledge engine 118, and an action engine 120. The program code can be stored on a non-transitory computer-readable medium.

The client device 104 can include any computing device capable of sending and receiving information. For example, the client device 104 can be a smart phone, laptop computer, desktop computer, wearable device, and the like. The client device 104 can, for example, be a computing device capable of communicating over a network (e.g., public network 108) to send and receive information. The client device 104 can, in some embodiments, be associated with a user or a user account.

In some embodiments, the AI-assistance service system 102 can include a transaction database 122 and a vector database 124 that are communicatively coupled to the AI-assistance service server 110 via a private network 126. The transaction database 122 and the vector database 124 can store a variety of different types of data, such as current and historical financial data associated with a user account of the user of the client device 104. For example, the transaction database 122 can store information about financial transactions in which a user or an enterprise associated with a user is involved. The transaction database 122 can be, for example, a structured database or data warehouse. In some examples, the transaction database 122 can store transaction data imported from a database of an external financial system 106. The vector database 124 can store any articles, document, or files, for example, business-related and financial information associated with the user or the enterprise associated with the user. In some embodiments, the vector database 124 stores financial and business information as vector embeddings.

Figure 2:
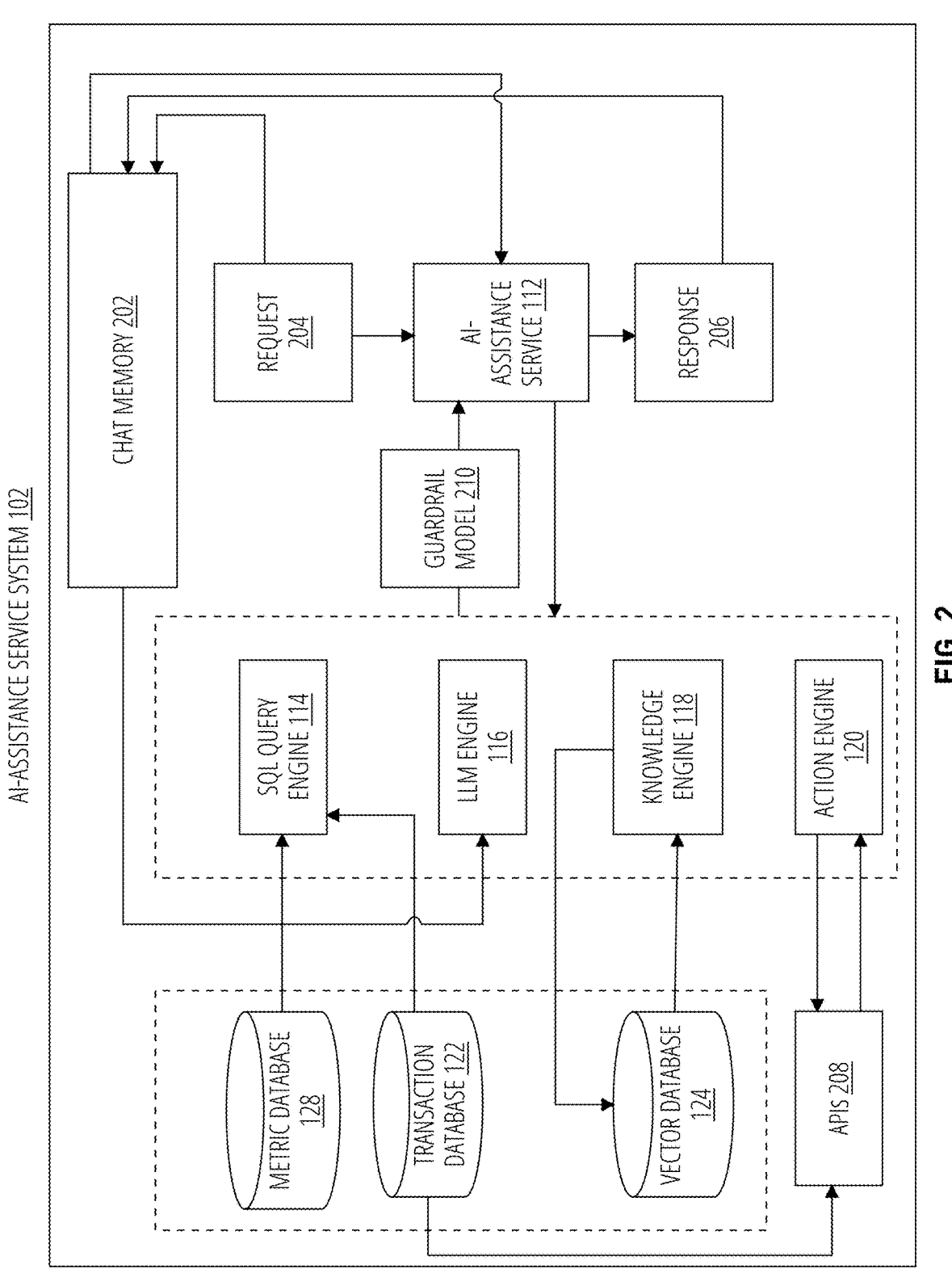
FIG. 2 illustrates another example architecture of a system for providing an AI-assistance service in accordance with some embodiments of the present technology.

FIG. 2 is a diagram illustrating an example architecture of an AI-assistance service system 102. As discussed above, the AI-assistance service system 102 can include an AI-assistance service 112, SQL query engine 114, an LLM engine 116, a knowledge engine 118, and an action engine 120. The AI-assistance service system 102 can also include network-attached storage, such as a transaction database 122 and a vector database 124. In some embodiments, the AI-assistance service system 102 can also include a chat memory 202 configured to store a history of requests and responses between a user and an interface of the AI-assistance service 112.

The AI-assistance service system 102 described herein can be used to carry out a financial transaction as requested by a user via a user account of the client device 104. In a non-limiting example, a user can submit a request 204, via an interface of the AI-assistance service 112 to the AI-assistance service system 102. The interface of the AI-assistance service 112 can be, for example, a chatbot or virtual assistant, which might be supported by a language model. In some examples, the interface of the AI-assistance service 112 is a proxy to one or more chatbots, virtual assistants, and/or language models.

In some embodiments, the AI-assistance service 112 can provide the request to carry out a financial transaction to an intent model. The intent model can be a language model, such as an LLM, and can be trained to determine an intent of natural language text. For example, the LLM can be configured to receive natural language text as input and output an intent of the text based on a contextual analysis of the text. In some embodiments, the intent model can be any foundational language model provided by a platform such as GPT-4o or Claude 3.5 Sonnet, or any other future models. In some examples, the intent model can be a language model trained via reinforcement learning to output a decision in response to the request based on past decisions. The intent model can use the request as at least part of a prompt including a direction provided by the interface to the AI-assistance service 112. The prompt can instruct the intent model as to a characteristic of a desired reply. A characteristic can be to identify an intent of the request to carry out the financial transaction. For example, the prompt can instruct the intent model to generate an intent of the request based on the text of the request. In response to the prompt, the intent model can generate an intent of the request to carry out the financial transaction. The intent can be provided, by the AI-assistance service 112, to one of the engines (e.g., the SQL query engine 114, the LLM engine 116, or the knowledge engine 118). Each engine can include its own process or implementation for how to compute a result based on the user's intent. For example, each engine can use a combination of custom logic and language models.

The AI-assistance service 112 can receive the response to the prompt and provide the response to the SQL query engine 114. In some examples, the SQL query engine 114 can be associated with a set of pre-written "golden" metrics in a metric database 128. Each golden metric can include metadata such as a metric name, metric description, associated keywords, and associated SQL query that can be used to compute the metric. The SQL query engine 114 can execute a semantic retrieval step, where SQL query engine 114 attempts to match the natural language text of the user's request to a most relevant golden metric. In some examples, the SQL query engine 114 can pass the SQL query associated with the most relevant metric to a model (e.g., an LLM), which can revise the query such that the revised query can be used to answer more varied user queries for the relevant metric. For example, the model can, based on the user request, revise the SQL query associated with the relevant metric by varying parameters of the SQL query. Thus, the SQL query engine 114 can reduce the risk of hallucinations, while still allowing for flexibility. The SQL query associated with the relevant metric, or the revised SQL query associated with the relevant metric, can be executed on the user's data in the transaction database 122. Another model (e.g., another LLM) can be used to return the result of the query to the user as a natural language response to the request 204. Thus, in some embodiments, the SQL query engine 114 can be used to answer requests that can be directly mapped to golden metrics having predefined SQL queries for retrieving or computing the metric. In other examples, the SQL query engine 114 can dynamically answer user requests using an LLM-generated structured query, where the structured query is based on the schema of the transaction database 122.

In some examples, for data purity or data isolation, when executing a structured query on a database (e.g., the transaction database 122), the SQL query engine 114 can apply one or more security engineering approaches. For example, the SQL query engine 114 can use user authentication to verify the identity of the user making the request 204 and apply row-level security on the database table based on the user identity. For example, row-level security can limit access to only those rows of the database table associated with the user identity. In another example, the SQL query engine 114 can apply a structured query augmentation approach. In this example, the SQL query engine 114 can apply an additional filter on the data to guarantee that the data returned is associated with only the user, or an entity associated with the user, making the request.

The AI-assistance service 112 can access the response from the transaction database 122 and provide the response to an LLM. The LLM can generate a natural language response based on or including the data retrieved from the transaction database 122. In some embodiments, the LLM engine 116 can generate a natural language response to requests received from the client device 104 that are not handled by either the SQL query engine 114 or the knowledge engine 118. For example, the language model of the LLM engine 116 can receive as input previous requests and responses from a chat history and can generate a response 206 to the request 204. The response can, for example, be a conversational or natural-language response providing explanation of financial data or a recommendation for proceeding with the requested financial transaction or requesting additional information from the user. In some examples, the AI-assistance service 112 can provide the response 206 generated by the language model of the LLM engine 116 to the client device 104 and to the chat memory 202, for reference in future interactions with the user.

As an example, the LLM engine 116 can determine that additional information that was not retrieved from the transaction database 122 is needed to evaluate the request 204. The language model of the LLM engine 116 may generate a response 206 including a prompt for the user to provide additional information via the interface of the AI-assistance service 112. The AI-assistance service 112 can receive the additional information and transmit the additional information to the LLM engine 116, such that the additional information can be provided as additional input to the language model of the LLM engine 116. In some examples, the AI-assistance service 112 may request and receive several iterations of information from the user, asynchronously or in real-time, which are all stored in the chat memory 202 and can be retrieved to provide context to the language model of the LLM engine 116.

When a full response to the request 204 is generated, i.e., when no additional information is needed from the user, the AI-assistance service 112 can provide the response to the guardrail model 210. In some examples, the response provided to the guardrail model 210 can indicate a financial transaction or a financial query and a particular account. The particular account can be an account belonging to the user account or to an enterprise associated with the user account. Additionally, the guardrail model 210 can receive the data retrieved from the transaction database 122, as well as any data received from the chat memory 202.

In some embodiments, the AI-assistance service 112 can provide the request to the knowledge engine 118. For example, requests directed to questions of financial knowledge or business strategy can be handled by the knowledge engine 118. The knowledge engine 118 can be trained on a corpus of documents stored in the vector database 124 and can provide natural language responses based on the corpus of documents. For example, an LLM of the knowledge engine 124 can be trained on vector representations of the documents stored in the vector database 124. The corpus of documents can include, for example, articles, files, or other data associated with business and finance.

The guardrail model 210 can evaluate the response generated by the SQL query engine 114 or the knowledge engine 118 to confirm that the response does not include data from other accounts other than the particular account (e.g., the user account) associated with the request. The guardrail model 210 can ensure that the response determined by the respective SQL query engine 114 or the knowledge engine 118 is accurate and is not based on, or does not include, data that is not associated with the user account. This is particularly important in financial decision-making, where outcomes can have effects on the operations of an enterprise, as well as on the involved financial institution that is taking on any risk. In some embodiments, the guardrail model 210 can also determine whether the response from the SQL query engine 114 or the knowledge engine 118 comports with expected outputs for requests having similar intent and parameters as the request pertaining to the financial query.

In some examples, the intent model can route the intent to an action engine 120. For example, the intent model can determine the intent and determine whether the action associated with the intent can be completed or whether the intent can be answered using actions defined in the action engine 120. The action engine 120 can use a large action model (LAM) to identify which actions to perform, or which APIs (e.g., of APIs 208) to execute, to carry out the financial transaction, or other actions not limited to financial transactions. The action engine 120 can use information associated with the user (e.g., a user ID) or token to authenticate to the APIs 208, so the actions carried out affect the current user only and do not operate on other user accounts.

In some examples, the guardrail model 210 can validate that the selected action in appropriate and accurate to the user query, e.g., based on the intent determined by the intent model. In some embodiments, a GUI of the client device 104 can display a prompt that asks the user to review and confirm the selected actions. After the transaction is confirmed by the guardrail model 210 and/or the user, one or more APIs of the APIs 208 can be executed to complete the transaction.

Figure 3:
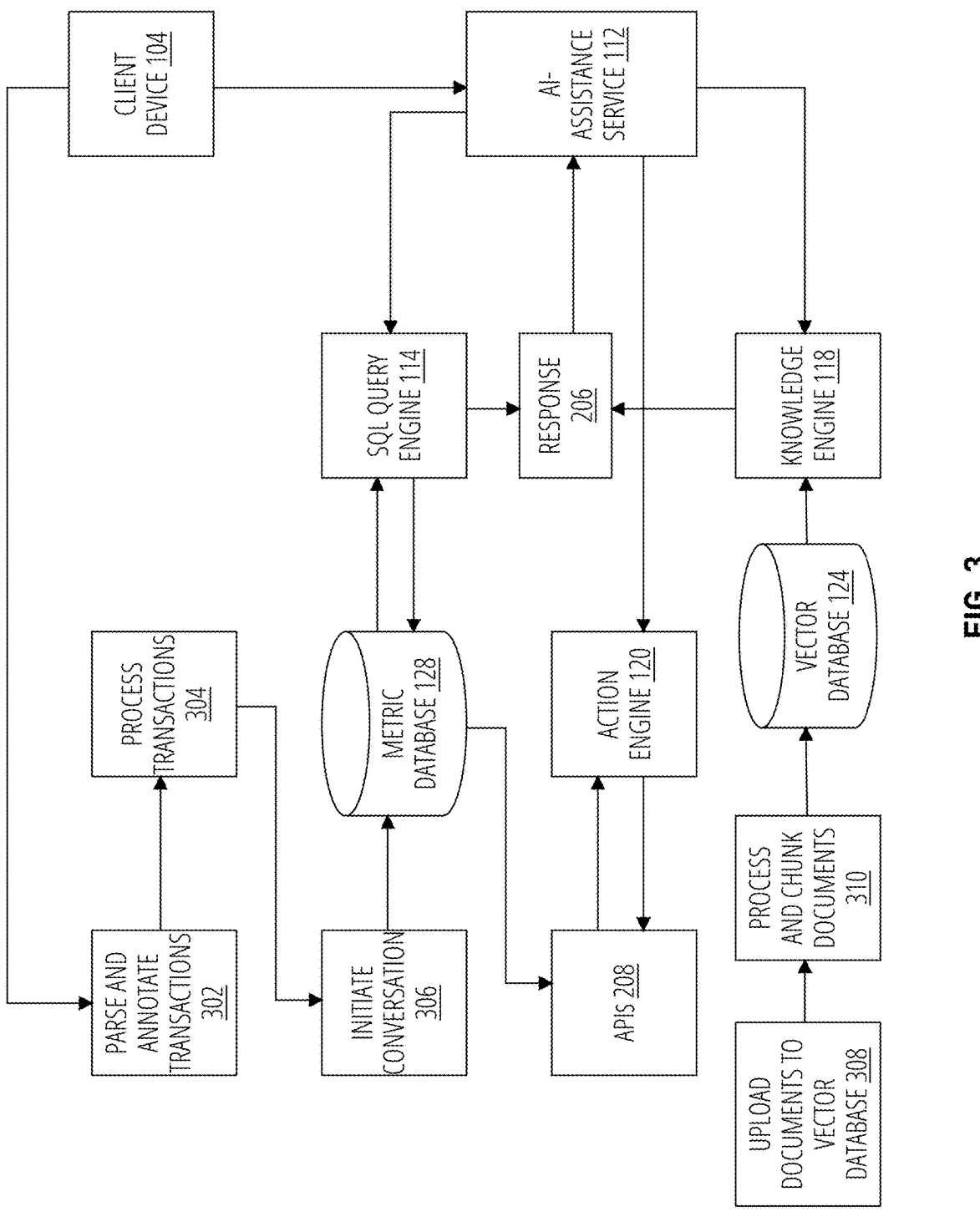
FIG. 3 illustrates a data flow diagram for processing conversational user queries about their finances or financial transactions in accordance with some embodiments of the present technology.

FIG. 3 is an exemplary data flow diagram of a process 300 for interacting with an AI-assistance service 112 to carry out a financial transaction.

At block 302, the AI-assistance service system 102 can receive a transaction data set. For example, the AI-assistance service 112 can interact with the client device 104 to link one or more accounts associated with a user account of the client device 104 from one or more external financial systems 106. In some embodiments, the transaction data set can be received directly from the client device 104. The transaction data set can be, for example, tabular data describing transactions associated with the user account that provide an indication of a financial position of a user or enterprise associated with the user account. In some embodiments, the AI-assistance service 112 can parse and annotate the transactions received in the transaction data set to store context or metadata associated with each transaction.

At block 304, the AI-assistance service 112 can process the received and annotated transactions. Processing the transactions can include cleaning the data, as well as transforming the data to match a schema of the transaction database 122. The AI-assistance service 112 can associate the data with the user account and store the data in the transaction database 122 for use in carrying out financial transactions.

When a request is received at the AI-assistance service 112, at block 306, the AI-assistance service 112 can initiate a conversation with a user of the client device 104. For example, a user may submit a request to carry out a financial transaction via an interface of the AI-assistance service 112. The AI-assistance service 112 can use one or more language models (e.g., LLMs) to engage in a real-time, conversational interaction with the user to complete the requested financial transaction.

Simultaneously, or in sequence, the AI-assistance service 112 can provide the request from the client device 104 to the SQL query engine 114. As discussed above with reference to FIG. 2, the intent model can generate an intent associated with the request and the SQL query engine 114 can use the user request to build a structured query associated with the request. For example, the SQL query engine 114 can determine a relevant metric and retrieve data associated with this metric from the metric database 128. The retrieved data can include a SQL query associated with the metric, which can, in some embodiments, be modified by the SQL query engine 114 (e.g., using an LLM) to generate a more accurate SQL query for the metric based on the intent. The generated query can be used to retrieve data from the transaction database 122 to generate a response.

The AI-assistance service 112 can interact with the user via the client device 104 by providing one or more responses 206 to the client device 104. For example, responses 206 can be used to prompt the user to provide additional information necessary to handle the request to carry out the financial transaction. The determination that additional information is needed can be made by the SQL query engine 114, the LLM engine 116, the knowledge engine 118, or, in some embodiments, the action engine 120.

Once the necessary information is received, the action engine 120 can interact with an external financial system 106 via the APIs 208 to carry out the financial transaction. For example, the action engine 120 can receive a prompt from the AI-assistance service 112 to carry out the financial transaction. The action engine 120 can interact with the external financial system 106 to provide data needed by the external financial system 106 (e.g., data from the financial metrics table) to complete the financial transaction. In some embodiments, the action engine 120 may interact with the AI-assistance service 112, and the user of the client device 104, to complete one or more steps required to carry out the financial transaction. Steps can include, for example, applying for capital, making payments on a loan, checking an account balance, etc.

At block 308, the AI-assistance service system 102 can receive predefined finance- and business-related knowledge (e.g., as one or more documents or files). In some embodiments, at block 310, the AI-assistance service system 102 can process and chunk the documents, for example, to generate vector embeddings describing the documents. The vector embeddings can then be stored in the vector database 124 for use by the knowledge engine 118 in generating responses 206 to requests or queries concerning general knowledge related to business and finance. In some examples, the vector database 124 can also be used by the guardrail model 210 to confirm the data used in generating responses 206 or to take an action.

Figure 4A:
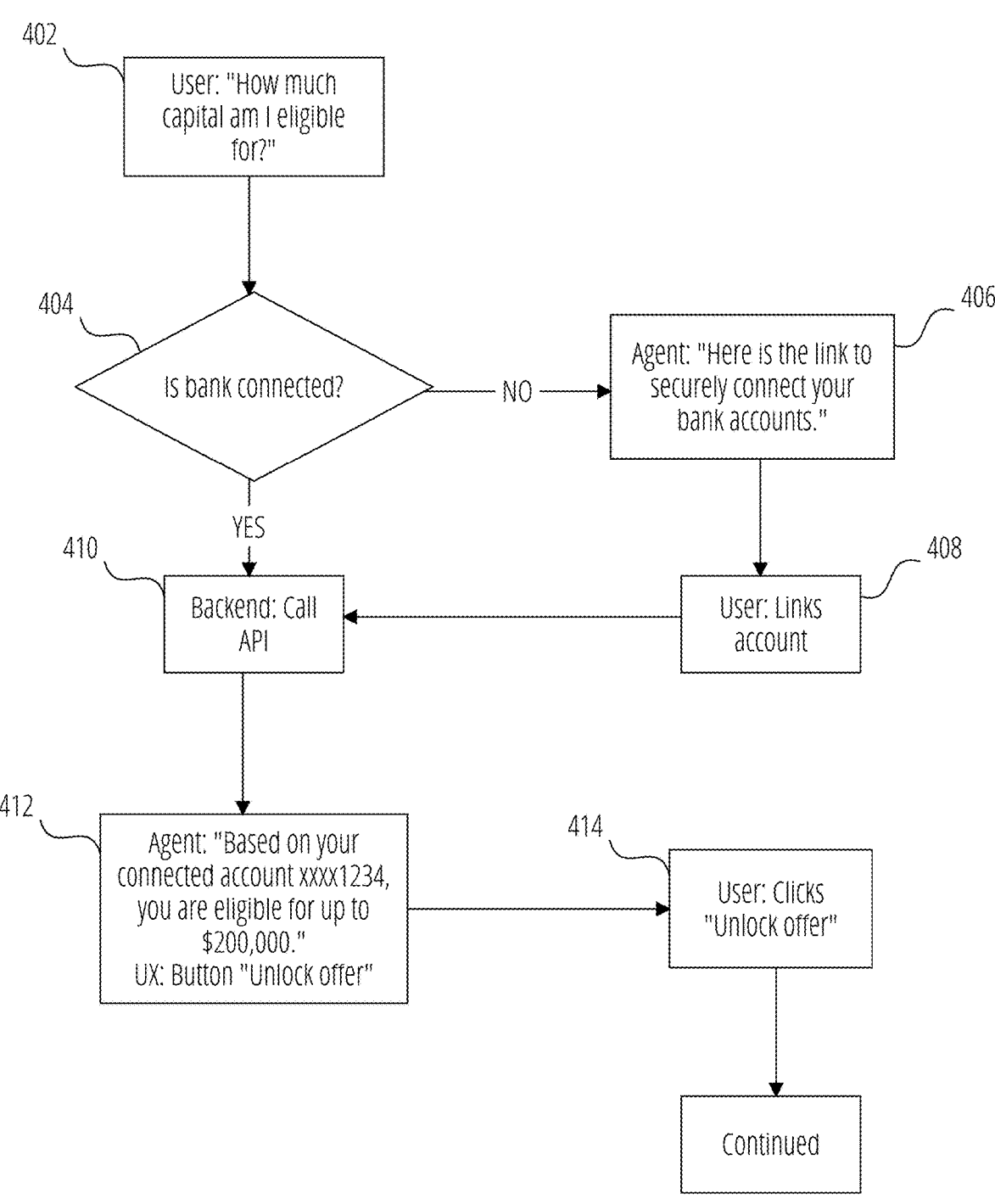
FIG. 4A illustrates a flow diagram of a user interaction with an AI-assistance service in accordance with some embodiments of the present technology.
Figure 4B:
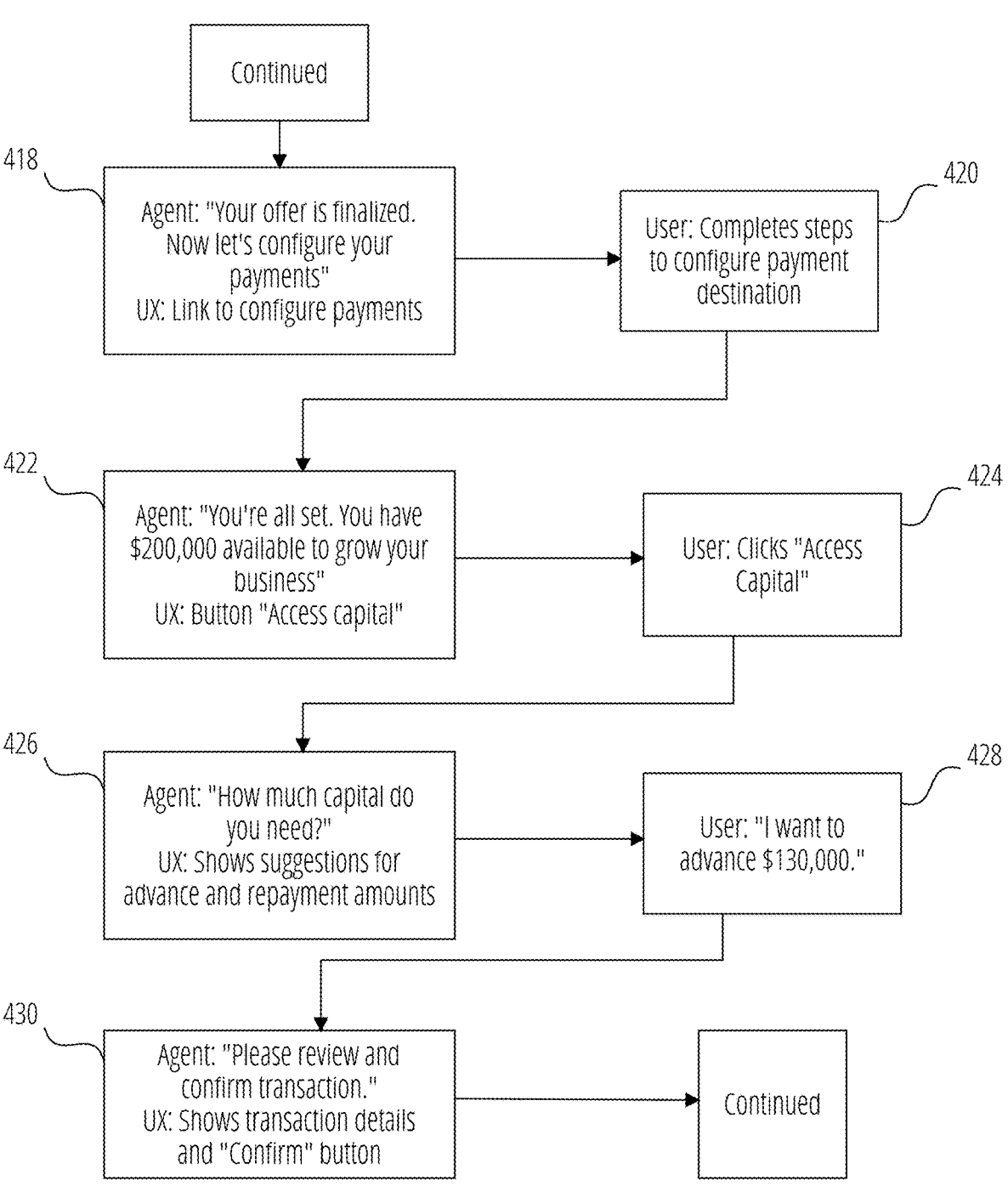
FIG. 4B illustrates a continuation of the flow diagram of a user interaction with an AI-assistance service in accordance with some embodiments of the present technology.

FIGS. 4A and 4B illustrate a flow chart of a process 400 for interacting with an AI-assistance service (e.g, the AI-assistance service 112). The process 400 can be carried out using one or more components of the system described with reference to FIG. 1, FIG. 2, and/or FIG. 3.

At block 402, a user can provide a natural-language request or prompt to an interface of the AI-assistance service 112. For example, a user may enter a request such as, "How much capital am I eligible for?" In the backend, the AI-assistance service 112 can determine, at block 404, that an external financial system, such as a bank system, is required to carry out the requested financial transaction and may determine whether or not a bank account associated with the user is linked to the AI-assistance service system 102.

If no bank account is linked to the AI-assistance service system 102, at block 406, the interface of the AI-assistance service 112 can, using the action engine 120 and LLM model, generate a response to the user providing a link to the user through which a bank account can be linked to the AI-assistance service system 102.

At block 408, the user can complete one or more actions to link a bank account to the AI-assistance service system 102. Actions can include, for example, providing an account number, providing a username/password combination, completing multi-factor authentication, or otherwise providing consent or permission for data sharing with the AI-assistance service system 102.

When a bank account of the user is linked to the AI-assistance service system 102, the process 400 can proceed to block 410. At block 410, the AI-assistance service 112, via the action engine 120, can call an API associated with the external financial system 106 of the bank. Via the API, the AI-assistance service 112 can retrieve data associated with the user and can provide this data to the LLM model so the LLM engine 116 can use a language model to generate a response.

At block 412, the response can be provided to the user via an interface of the client device 104. For example, a response can include an indication of the account and a determination of an amount of capital that the user is eligible for. In some embodiments, the amount of capital can be determined using a risk underwriting model of the AI-assistance service system 102. The amount of capital can be determined based on the user's financial position as determined from the data shared with the AI-assistance service system 102 via the linked bank account. For example, the risk underwriting model can be trained on data (e.g., financial data) to determine a risk associated with the requested action based on the user account (e.g., based on financial data associated with the user account). At block 412, the response can further cause the client device 104 to display an interface with the textual response and a prompt, such as "Unlock offer," for the user to proceed with the financial transaction.

At block 414, the user can click the "Unlock offer" button to proceed with the process for requesting capital. The process 400 is continued in FIG. 4B.

Now referring to FIG. 4B, at block 418 the AI-assistance service 112 can provide the selected "Unlock offer" prompt to the action engine 120, which can use the language model to generate a response to the user. For example, the response can confirm the capital offer and can include a link through which the user can continue the process by configuring payments.

At block 420 the user can click the link to configure payments. In some embodiments, the user can interact directly with the external financial system 106 via a portal to set up payments. In other embodiments, the user can interact, via the AI-assistance service 112, with an API of the external financial system 106 to set up payments.

At block 422, the AI-assistance service 112 can generate a response using the language model of the LLM engine 116, where the response confirms that the user has successfully set up payments and has access to the available capital. The interface of the AI-assistance service 112 can also prompt the user to access capital (e.g., request a disbursement) via a button displayed via a GUI on the client device 104.

At block 424, the user can click the "Access capital" button.

At block 426, the AI-assistance service 112 can determine that additional information (e.g., an amount of capital requested) is needed to proceed with the financial transaction. The AI-assistance service 112 can prompt the user to provide this information. In some embodiments, the AI-assistance service 112 can provide the prompt to the LLM engine 116 to generate, using the language model, suggested advance and repayment options based on the user's financial position.

In a more detailed example, the AI-assistance service 112 can use an LLM (e.g., the intent model) to determine an intent of the request to access capital. The AI-assistance service 112 can provide the determined intent to the SQL query engine 114 for generating a structured query to retrieve data needed to model possible advance and repayment options. The SQL query engine 114 can query the transaction database 122 to retrieve data, that is then used by the LLM engine 116 to parameterize a language model to generate the possible advance and repayment options based on the user's current financial position. These options can then be provided to the user via the interface of the AI-assistance service 112.

At block 428, the user can select an advance amount to proceed with the financial transaction.

At block 430, the AI-assistance service 112 can use a language model to generate a response requesting confirmation from the user of the transaction and transaction amount. For example, a GUI can display the financial transaction details and a "Confirm" button for proceeding with the advance at an amount of $130,000. Confirmation can be requested to ensure that the AI-assistance service 112 carries out the exact transaction intended by the user, minimizing the risk that the action mismatches the intent of the original request.

Figure 4C:
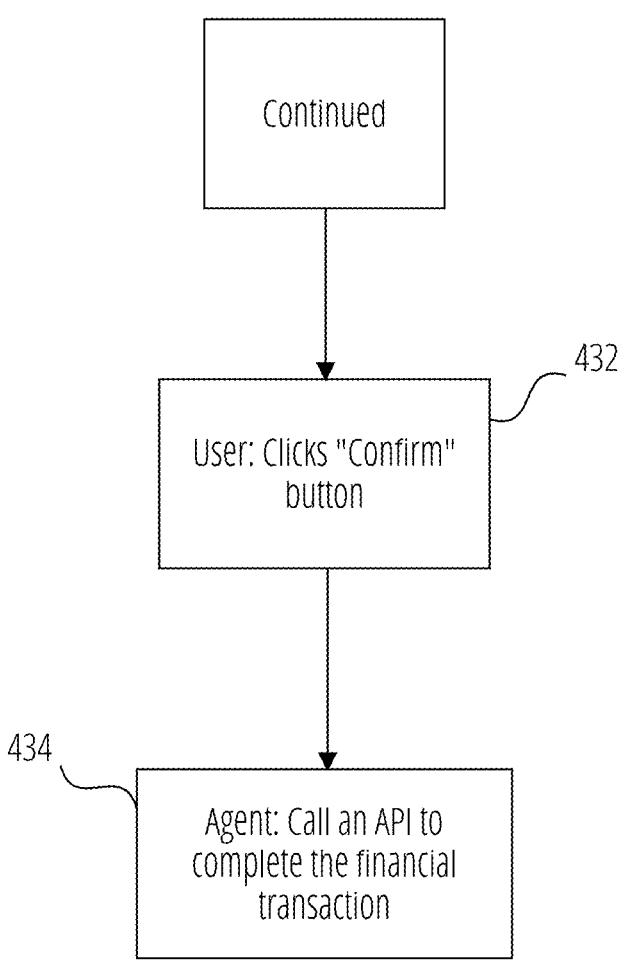
FIG. 4C illustrates a continuation of the flow diagram of a user interaction with an AI-assistance service in accordance with some embodiments of the present technology.

Now referring to FIG. 4C, at block 432, the user can click the "Confirm" button to proceed with the transaction.

At block 434, the AI-assistance service can call an API (e.g., one of APIs 208) to complete the financial transaction with the appropriate financial entity.

FIG. 5 illustrates an example method 500 for carrying out a financial transaction using an AI-assistance service. Although the example method depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method 500 includes receiving, by an interface to an AI-assistance service, a request to carry out a financial transaction pertaining to a particular account at block 502. In some examples, the particular account can be associated with a user or enterprise associated with a user account through which the request is provided. The request can be provided to an intent model of the AI-assistance service, where the intent model determines an intent of the request.

According to some examples, method 500 includes determining an action (e.g., using the action engine 120) based on the intent of the request to carry out the financial transaction at block 504. For example, the AI-assistance service can determine data relevant to the financial transaction to gather, and can gather the data from a particular SQL database to make a determination about whether to carry out the financial transaction (e.g., using the SQL query engine 114). Once the transaction data is retrieved and synthesized at the SQL query engine 114, the action engine 120 can be used to carry out the determined action. Making this determination of whether to carry out the financial transaction can include: sending, to the AI-assistant service, the request to carry out the financial transaction with an instruction to determine an intent of the request to carry out the financial transaction in a first prompt from the proxy to the AI-assistant service; receiving the intent of the request from the AI-assistant service; and creating a SQL query of the particular SQL database based on the intent. The SQL query can be specific to attributes of the particular SQL database and can be configured to retrieve at least some of the data relevant to the financial transaction.

For example, the intent model of the AI-assistance service 112 can determine the intent and route the intent to the SQL query engine 114, which can map the intent to a metric stored in the metric database 128. The SQL query engine 114 can query the metric database 128 to retrieve a SQL query that is executable to retrieve or compute the metric. In some examples, a language model can be used to modify the retrieved query based on the intent or other data associated with the request (e.g., parameters such as date ranges, accounts, etc.). The query associated with the metric can be executed on the transaction database 122 to return data relevant to the request to carry out the financial transaction.

According to some examples, the method 500 can include generating, by an LLM, a text response to the request to carry out the financial transaction at block 506. As an example, the AI-assistance service can receive a second prompt including data relevant to the financial transaction along with information in the request to carry out the financial transaction with instructions to the AI-assistant service to generate the text response to the request to carry out the financial transaction using a retrieval augmented generation technique that focuses the text response to be based on the data relevant to the financial transaction. In some embodiments, the text response can be generated by a language model and can be based on the intent and the retrieved data from the transaction database 122 that is associated with the particular account.

According to some examples, the method 500 can include evaluating, by a guardrail model, the text response to confirm data purity and to conformation with expected outputs at block 508. A guardrail model of the AI-assistance service can evaluate the text response to the second prompt from the AI-assistant service. The guardrail model 210 can be configured to confirm that the text response to the second prompt does not include data from accounts other than the particular account, and that the text response to the second prompt comports with expected outputs for requests having a similar intent as the request pertaining to the financial transaction.

According to some examples, the method 500 can include executing, by an action engine, one or more tasks to complete the financial transaction based on the intent at block 510. For example, the intent model can route the determined intent to the action engine 120. Based on the intent, the action engine 120 can determine one or more APIs (e.g., of the APIs 208) to execute to carry out the financial transaction. Thus, a financial service can perform the financial transaction as instructed in the text response. In some examples, the financial transaction is performed semi-autonomously in response to the request.

Accordingly, the method 500 can be used to carry out a financial transaction on behalf of a user or an enterprise associated with the user while ensuring data fidelity and response accuracy. Thus, the described AI-assistance service 112 can be used to facilitate the use of one or more models to service financial requests and provide financial insights, while mitigating the risk of hallucinations. For example, the knowledge engine 118 can execute a RAG framework over public or shared documents stored as vector embeddings in the vector database 124, while the SQL engine 114 can query the transaction database 122 for data associated with the user. Described systems and methods can also be applied to decisions to extend lines of credit, to approve a loan or mortgage, to facilitate mobile banking, and other financial applications.

Because disclosed systems and methods mitigate the risks of model hallucinations and ensure models are trained on data belonging only to a particular user or enterprise, systems and methods can be applied to situations in which data privacy and recommendation accuracy are important. For example, disclosed systems and methods can be applied to applications in health care, where it is important that data of different patients is not comingled in generating a response for a particular patient. For example, the SQL query engine 114 can apply a user-identity-based filter over a patient's records and can be used to ensure data from other patients is not inadvertently used in providing a recommendation for a particular patient. In another example, the SQL query engine 114 can generate a query over aggregated and anonymized population data.

An additional application of the above-described systems and methods is in security and cybersecurity. For example, in security applications, hallucinations by a model can result in an entity inadvertently gaining access to a secure resource. This can result in system vulnerability and can allow access to the system by bad actors. The action engine 120 can contain a limited set of predefined actions, such that it is not possible for an LLM of the system to gain access to secure resources due to the implementation of security strategies like user authentication. Thus, the system can ensure that the action taken by the action engine 120 is accurate and relevant and can ensure data privacy and reliability through security engineering approaches, thereby decreasing the risk of mistakenly providing access to restricted systems and resources.

Figure 6:
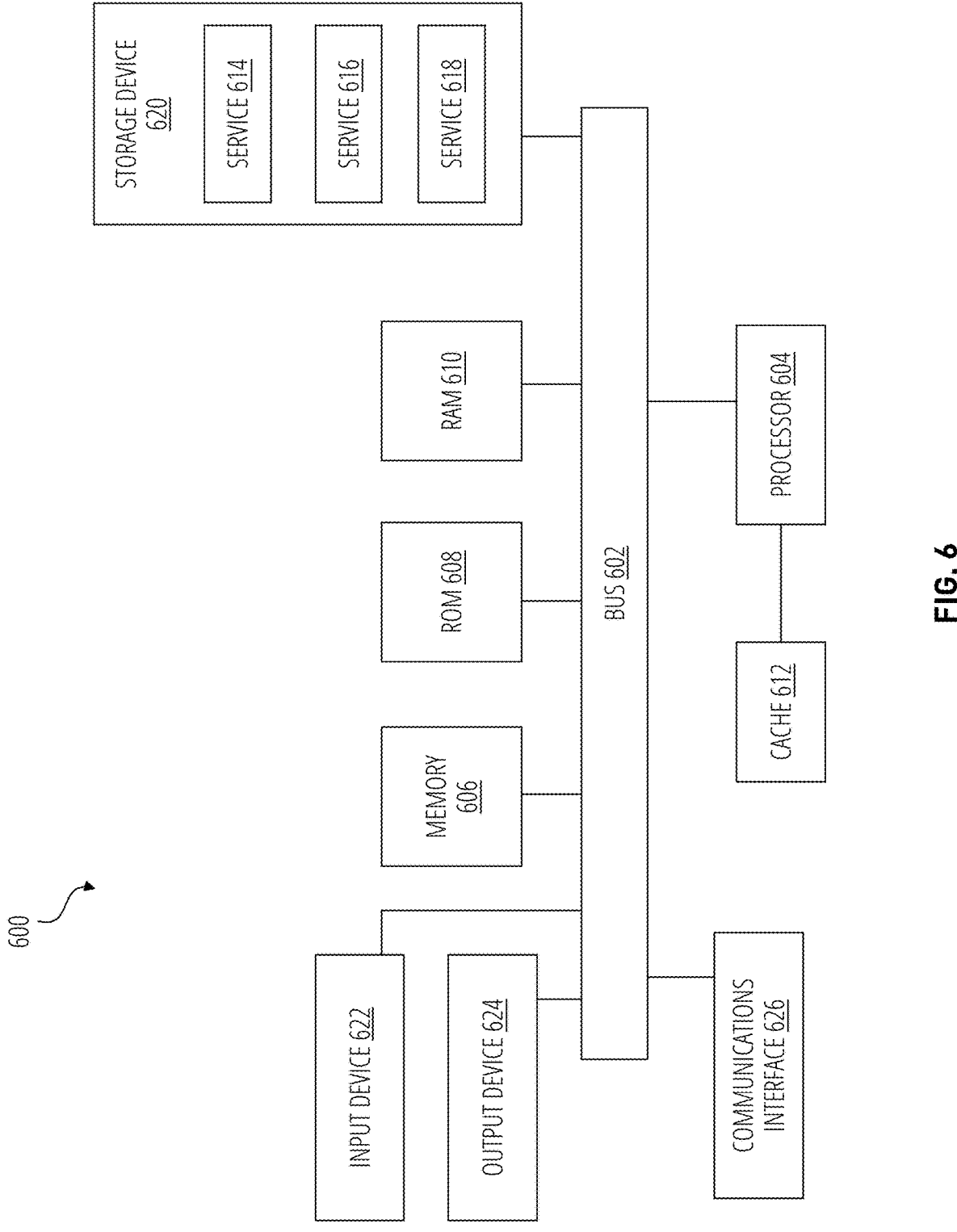
FIG. 6 illustrates an example computing device for implementing an AI-assistance service in accordance with some embodiments of the present technology.

FIG. 6 illustrates a computing system architecture, according to some aspects of the present disclosure. Components of computing system architecture 600 are in electrical communication with each other using a connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 604 and connection 602 that couples various system components including system memory 606, such as read-only memory (ROM) 608 and random-access memory (RAM) 610 to processor 604. Computing system 600 can include a cache of high-speed memory 612 connected directly with, in close proximity to, or integrated as part of processor 604.

Processor 604 can include any general-purpose processor and a hardware service or software service, such as services 614, 616, and 618 stored in storage device 620, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 622, which can represent any number of input mechanisms, such as a microphone for speech, a touch-sensitive screen for gesture or graphical input, keyboard, mouse, motion input, speech, etc. Computing system 600 can also include output device 624, which can be one or more of a number of output mechanisms known to those of skill in the art. In some instances, multimodal systems can enable a user to provide multiple types of input/output to communicate with computing system 600. Computing system 600 can include communications interface 626, which can generally govern and manage the user input and system output. There is no restriction on operating on any particular hardware arrangement, and therefore the basic features here may easily be substituted for improved hardware or firmware arrangements as they are developed.

Storage device 620 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 620 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 624, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:

receiving, by an interface to an artificial intelligence-assistant (AI-assistant) service, a request to carry out a financial transaction pertaining to a particular account;

outputting, by a large language model (LLM) of the AI-assistant service, an intent of the request based on the request;

retrieving, by a query engine from a metric database, a predefined structured query for retrieving a metric relevant to responding to the request from a structured database;

generating, by the LLM, a custom query by varying a parameter of the predefined structured query based on the intent of the request while preserving a structure of the predefined structured query, wherein the predefined structured query comprises a schema-defined template that restricts modification to predefined parameter fields, and wherein the custom query is specific to attributes of a transaction database and adheres to a schema of the transaction database, thereby facilitating the use of the LLM to generate an executable query;

retrieving, by the query engine from the transaction database, transaction data using the custom query, wherein the transaction data is limited to data associated with the particular account based on application of a row-level filter and wherein the transaction data is relevant to the financial transaction;

receiving, from the AI-assistant service, a text response to the request to carry out the financial transaction, wherein the text response is an instruction to carry out the financial transaction and wherein the text response is based in part on the transaction data associated with the particular account;

determining, by a guardrail model, that the text response is not based on transaction data associated with accounts other than the particular account; and instructing a financial service to complete the financial transaction using the text response, wherein the financial transaction is semi-autonomously performed in response to the request and is based on the text response generated from row-level filtered transaction data.

2. The method of claim 1, wherein the interface to the AI-assistant service is a proxy for one or more chatbots or language models.

3. The method of claim 1, wherein the interface to the AI-assistant service comprises at least one of a chatbot supported by a language model or a proxy to the language model.

4. The method of claim 1, wherein the text response is in natural language or a programming language interpretable by an action engine.

5. The method of claim 1, further comprising:

outputting, by the LLM, the text response based, in part, on the intent, wherein the transaction data associated with the particular account is provided as parameters to the LLM.

6. The method of claim 1, further comprising:

providing a second prompt to the AI-assistant service, the second prompt including the transaction data relevant to the financial transaction along with information in the request to carry out the financial transaction to the AI-assistant service with instructions to the AI-assistant service to generate the text response to the request to carry out the financial transaction using a retrieval augmented generation technique that focuses the text response to be based on the transaction data relevant to the financial transaction.

7. The method of claim 6, further comprising:

evaluating the text response to the second prompt from the AI-assistant service by a knowledge engine, the knowledge engine being configured to confirm that the text response to the second prompt does not include data from accounts other than the particular account, and that the text response to the second prompt comports with expected outputs for requests having a similar intent as the request pertaining to the financial transaction.

8. The method of claim 6, wherein the AI-assistant service can be multiple different services, including a general language model service and a domain-specific language model, wherein the first prompt goes to the general language model, and the second prompt goes to the domain-specific language model, wherein the domain-specific language model is trained with domain-specific knowledge.

9. A computing system comprising:

at least one processor; and a memory storing instructions that, when executed by the at least one processor, configures the computing system to:

receive, by an interface to an artificial intelligence-assistant (AI-assistant) service, a request to carry out a financial transaction pertaining to a particular account;

output, by a large language model (LLM) of the AI-assistant service, an intent of the request based on the request;

retrieve, from a metric database, a predefined structured query for retrieving a metric relevant to responding to the request from a structured database;

generate, by the LLM a custom query by varying a parameter of the predefined structured query based on the intent of the request while preserving a structure of the predefined structured query, wherein the predefined structured query comprises a schema-defined template that restricts modification to predefined parameter fields, and wherein the custom query is specific to attributes of a transaction database and adheres to a schema of the transaction database, thereby facilitating the use of the LLM to generate an executable query;

retrieve, from the transaction database, transaction data using the custom query, wherein the transaction data is limited to data associated with the particular account based on application of a row-level filter;

receive, from the AI-assistant service, a text response to the request to carry out the financial transaction, wherein the text response is an instruction to carry out the financial transaction and wherein the text response is based in part on the transaction data associated with the particular account;

determine, by a guardrail model, that the text response is not based on transaction data associated with accounts other than the particular account; and instruct a financial service to complete the financial transaction using the text response, wherein the financial transaction is semi-autonomously performed in response to the request and is based on the text response generated from row-level filtered transaction data.

10. The computing system of claim 9, wherein the interface to the AI-assistant service is a proxy for one or more chatbots or language models.

11. The computing system of claim 9, wherein the interface to the AI-assistant service comprises at least one of a chatbot supported by a language model or a proxy to the language model.

12. The computing system of claim 9, wherein the text response is in natural language or a programming language interpretable by an action engine.

13. The computing system of claim 9, wherein the instructions further configure the apparatus to:

output, by the LLM, the text response based, in part, on the intent, wherein the transaction data associated with the particular account is provided as parameters to the LLM.

14. The computing system of claim 9, wherein the instructions further configure the apparatus to:

provide a second prompt to the AI-assistant service, the second prompt including the transaction data relevant to the financial transaction along with information in the request to carry out the financial transaction to the AI-assistant service with instructions to the AI-assistant service to generate the text response to the request to carry out the financial transaction using a retrieval augmented generation technique that focuses the text response to be based on the transaction data relevant to the financial transaction.

15. The computing system of claim 14, wherein the instructions further configure the apparatus to:

evaluate the text response to the second prompt from the AI-assistant service by a knowledge engine, the knowledge engine being configured to confirm that the text response to the second prompt does not include data from accounts other than the particular account, and that the text response to the second prompt comports with expected outputs for requests having a similar intent as the request pertaining to the financial transaction.

16. The computing system of claim 14, wherein the AI-assistant service can be multiple different services, include a general language model service and a domain-specific language model, wherein the first prompt goes to the general language model, and the second prompt goes to the domain-specific language model, wherein the domain-specific language model is trained with domain-specific knowledge.

17. A non-transitory computer-readable storage medium, the computer-readable storage medium including instructions that when executed by at least one processor, cause the at least one processor to:

receive, by an interface to an artificial intelligence assistant (AI-assistant) service, a request to carry out a financial transaction pertaining to a particular account;

outputting, by a large language model (LLM) of the AI-assistant service, an intent of the request based on the request;

retrieving, from a metric database, a predefined structured query for retrieving a metric relevant to responding to the request from a structured database;

generating, by the LLM a custom query by varying a parameter of the predefined structured query based on the intent of the request while preserving a structure of the predefined structured query, wherein the predefined structured query comprises a schema-defined template that restricts modification to predefined parameter fields, and wherein the custom query is specific to attributes of a transaction database and adheres to a schema of the transaction database, thereby facilitating the use of the LLM to generate an executable query;

retrieving, from the transaction database, transaction data using the custom query, wherein the transaction data is limited to data associated with the particular account based on application of a row-level filter;

receive, from the AI-assistant service, a text response to the request to carry out the financial transaction, wherein the text response is an instruction to carry out the financial transaction and wherein the text response is based in part on the transaction data associated with the particular account;

determine, by a guardrail model, that the text response is not based on transaction data associated with accounts other than the particular account; and instruct a financial service to complete the financial transaction using the text response, wherein the financial transaction is semi-autonomously performed in response to the request and is based on the text response generated from row-level filtered transaction data.

18. The computer-readable storage medium of claim 17, wherein the instructions further configure the at least one processor to:

output, by the LLM, the text response based, in part, on the intent, wherein the transaction data associated with the particular account is provided as parameters to the LLM.

19. The computer-readable storage medium of claim 17, wherein the instructions further configure the at least one processor to:

provide a second prompt to the AI-assistant service, the second prompt including the transaction data relevant to the financial transaction along with information in the request to carry out the financial transaction to the AI-assistant service with instructions to the AI-assistant service to generate the text response to the request to carry out the financial transaction using a retrieval augmented generation technique that focuses the text response to be based on the transaction data relevant to the financial transaction.

20. The computer-readable storage medium of claim 19, wherein the instructions further configure the at least one processor to:

evaluate the text response to the second prompt from the AI-assistant service by a knowledge engine, the knowledge engine being configured to confirm that the text response to the second prompt does not include data from accounts other than the particular account, and that the text response to the second prompt comports with expected outputs for requests having a similar intent as the request pertaining to the financial transaction.

* * * * *